US 7,778,641 B1

(12) United States Patent
Willars et al.

(10) Patent No.: US 7,778,641 B1
(45) Date of Patent: Aug. 17, 2010

(54) INTER-SYSTEM HANDOVER—GENERIC HANDOVER MECHANISM (75) Inventors: Per Willars, Stockholm (SE); Mats Stille, Stockholm (SE); Goran Rune, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 09/286,471

(22) Filed: Apr. 6, 1999

(51) Int. Cl.
*H04Q 7/20* (2006.01)
(52) U.S. Cl. ............... 455/436; 455/432.1; 370/331
(58) Field of Classification Search ......... 455/436–439, 455/432.1–2, 435.1–2; 370/331, 332
See application file for complete search history.

(56) References Cited

U.S. PATENT DOCUMENTS

| | | | |
|---|---|---|---|
| 5,276,907 A | 1/1994 | Meidan | |
| 5,345,467 A | 9/1994 | Lomp et al. | |
| 5,425,029 A | 6/1995 | Hluchyj et al. | |
| 5,640,414 A | 6/1997 | Blakeney, II et al. | |
| 5,737,703 A * | 4/1998 | Byrne | 455/442 |
| 5,771,275 A | 6/1998 | Brunner et al. | |
| 5,845,203 A | 12/1998 | LaDue | |
| 5,845,211 A * | 12/1998 | Roach, Jr. | 455/436 |
| 5,870,427 A | 2/1999 | Tiedemann, Jr. et al. | |
| 5,873,036 A | 2/1999 | Vucetic | |
| 5,930,241 A * | 7/1999 | Fried | 370/328 |
| 5,946,634 A * | 8/1999 | Korpela | 455/552.1 |
| 6,223,030 B1 * | 4/2001 | Van Den Heuvel et al. | 455/435.2 |
| 6,243,581 B1 * | 6/2001 | Jawanda | 455/432.2 |
| 6,438,370 B1 * | 8/2002 | Einola et al. | 455/422.1 |
| 6,473,411 B1 * | 10/2002 | Kumaki et al. | 370/331 |
| 6,510,146 B1 | 1/2003 | Korpela et al. | |
| 6,556,820 B1 * | 4/2003 | Le et al. | 455/411 |
| 6,594,242 B1 * | 7/2003 | Kransmo | 370/331 |
| 6,912,230 B1 * | 6/2005 | Salkini et al. | 370/466 |
| 6,996,079 B1 * | 2/2006 | Bergenwall et al. | 370/331 |
| 7,194,710 B2 * | 3/2007 | Prasad et al. | 716/4 |

FOREIGN PATENT DOCUMENTS

| | | |
|---|---|---|
| CA | 2 282 449 | 12/2008 |
| WO | WO 98 06226 | 2/1998 |
| WO | WO 98/32262 | 7/1998 |
| WO | WO 98/36607 | 8/1998 |

OTHER PUBLICATIONS

Antipolis, S., "UE-UTRAN Radio Interface Protocol Architecture; Stage 2;" European Telecommunications Standards Institute, UMTS YY.01, V1.0.0, Dec. 1998, pp. 1-39.
Antipolis, S., UMTS Terrestrial Radio Access Network (UTRAN); UTRA FDD; (UMTS XX.03 V1.3.1), European Telecommunications Standards Institute, Feb. 1999, pp. 1-23.
Canadian Office Action mailed Mar. 3, 2009 in corresponding Canadian Application 2,368,468.

\* cited by examiner

*Primary Examiner*—CongVan Tran (57) ABSTRACT

A data mechanism is described for assisting third generational mobile radio systems to handoff mobile radio connection to neighboring cells when the neighboring cells are of a foreign generational type. The data mechanism includes a container in the data map which is a generic structure, not particular to any generational system. The generic structure can be content-specific to any of many different generational communications protocols.

42 Claims, 10 Drawing Sheets

| ⋮ |
|---|
| Neighbouring Cell n |
| Cell Type (UMTS, Foreign Type 1, Foreign Type 2, ...) |
| Neighbouring Cell Data (as specified by the specifications for the particular system) |
| Neighbouring Cell n-1 |
| Cell Type (UMTS, Foreign Type 1, Foreign Type 2, ...) |
| Neighbouring Cell Data (as specified by the specifications for the particular system) |
| Neighbouring Cell n-3 |
| Cell Type (UMTS, Foreign Type 1, Foreign Type 2, ...) |
| Neighbouring Cell Data (as specified by the specifications for the particular system) |
| ⋮ |

FIGURE 3

Alternative 1a-General Alternative, UMTS cells are treated as any cell.

| ⋮ |
|---|
| Neighbouring UMTS cells (according to the UMTS specification) |
| ⋮ |
| Neighbouring Cell n |
| Cell Type (Foreign Type 1, Foreign Type 2, ...) |
| Neighbouring Cell Data (as specified by the foreign system) |
| Neighbouring Cell n-1 |
| Cell Type (Foreign Type 1, Foreign Type 2, ...) |
| Neighbouring Cell Data (as specified by the foreign system) |
| Neighbouring Cell n-3 |
| Cell Type (Foreign Type 1, Foreign Type 2, ...) |
| Neighbouring Cell Data (as specified by the foreign system) |
| ⋮ |

FIGURE 4

Alternative 1b-Optimised Alternative, UMTS cells are treated differently.

| |
|---|
| ⋮ |
| MS Radio Capabilities |
| System Type (UMTS, Foreign Type 1, Foreign Type 2, ...) |
| MS Radio Capabilities Data (as specified by the specifications for the particular system) |
| MS Radio Capabilities |
| System Type (Foreign Type 1, Foreign Type 2, ...) |
| MS Radio Capabilities Data (as specified by the specifications for the particular system) |
| ⋮ |

FIGURE 5

Alternative 2a-General Alternative, UMTS radio capabilities are treated as any radio capability.

| |
|---|
| ⋮ |
| MS Radio Capabilities (according to the UMTS specification) |
| ⋮ |
| MS Radio Capabilities |
| System Type (Foreign Type 1, Foreign Type 2, ...) |
| MS Radio Capabilities Data (as specified by the foreign system) |
| ⋮ |

FIGURE 6

Alternative 2b-Optimised Alternative, UMTS radio capabilities are treated differently.

| |
|---|
| ⋮ |
| Neighbouring Cell n |
| Cell Type (UMTS, Foreign Type 1, Foreign Type 2, ...) |
| Neighbouring Cell Data (as specified by the specifications for the particular system) |
| Neighbouring Cell n-1 |
| Cell Type (UMTS, Foreign Type 1, Foreign Type 2, ...) |
| Neighbouring Cell Data (as specified by the specifications for the particular system) |
| Neighbouring Cell n-3 |
| Cell Type (UMTS, Foreign Type 1, Foreign Type 2, ...) |
| Neighbouring Cell Data (as specified by the specifications for the particular system) |
| ⋮ |

FIGURE 7

Alternative 3a-General Alternative, UMTS radio capabilities are treated as any cell.

| |
|---|
| ⋮ |
| Neighbouring UMTS cells (according to the UMTS specification) |
| ⋮ |
| Neighbouring Cell n |
| Cell Type (Foreign Type 1, Foreign Type 2, ...) |
| Neighbouring Cell Data (as specified by the foreign system) |
| Neighboring Cell n-1 |
| Cell Type (Foreign Type 1, Foreign Type 2, ...) |
| Neighbouring Cell Data (as specified by the foreign system) |
| Neighbouring Cell n-3 |
| Cell Type (Foreign Type 1, Foreign Type 2, ...) |
| Neighbouring Cell Data (as specified by the foreign system) |
| ⋮ |

FIGURE 8

Alternative 3b-Optimised Alternative, UMTS cells are treated differently.

| |
|---|
| ⋮ |
| Neighbouring Cell n |
| Cell Type (UMTS, Foreign Type 1, Foreign Type 2, ...) |
| Measurement Control Data (as specified by the specifications for the particular system) |
| Neighbouring Cell n-1 |
| Cell Type (UMTS, Foreign Type 1, Foreign Type 2, ...) |
| Measurement Control Data (as specified by the specifications for the particular system) |
| Neighbouring Cell n-3 |
| Cell Type (UMTS, Foreign Type 1, Foreign Type 2, ...) |
| Measurement Control Data (as specified by the specifications for the particular system) |
| ⋮ |

FIGURE 9

Alternative 4a-General Alternative, UMTS cells are treated as any cell.

| |
|---|
| ⋮ |
| Measurement Control Data for Neighbouring UMTS cells (according to the UMTS specification) |
| ⋮ |
| Neighbouring Cell n |
| Cell Type (Foreign Type 1, Foreign Type 2, ...) |
| Measurement Control Data (as specified by the foreign system) |
| Neighbouring Cell n-1 |
| Cell Type (Foreign Type 1, Foreign Type 2, ...) |
| Measurement Control Data (as specified by the foreign system) |
| Neighbouring Cell n-3 |
| Cell Type (Foreign Type 1, Foreign Type 2, ...) |
| Measurement Control Data (as specified by the foreign system) |
| ⋮ |

FIGURE 10

Alternative 4b-Optimised Alternative, UMTS cells are treated differently.

| |
|---|
| ⋮ |
| Neighbouring Cell n |
| Measurement Report Data (as specified by the specifications for the particular system) |
| Neighbouring Cell n-1 |
| Measurement Report Data (as specified by the specifications for the particular system) |
| Neighbouring Cell n-3 |
| Measurement Report Data (as specified by the specifications for the particular system) |
| ⋮ |

FIGURE 11

Alternative 5a-General Alternative, UMTS cells are treated as any cell.

| |
|---|
| ⋮ |
| Measurement Report Data for Neighbouring UMTS cells (according to the UMTS specification) |
| ⋮ |
| Neighbouring Cell n |
| Measurement Report Data (as specified by the foreign system) |
| Neighbouring Cell n-1 |
| Measurement Report Data (as specified by the foreign system) |
| Neighbouring Cell n-3 |
| Measurement Report Data (as specified by the foreign system) |
| ⋮ |

FIGURE 12

Alternative 5b-Optimised Alternative, UMTS cells are treated differently.

| |
|---|
| Message discriminator = "Handover Command" |
| System Type (UMTS, Foreign Type 1, Foreign Type 2, ...) |
| "Handover Command" (as specified by the specifications for the particular system) |

FIGURE 13

Alternative 6a-General Alternative, UMTS cells are treated as any cell.

| |
|---|
| Message discriminator = "Handover Command" |
| Handover Command parameters specific to UMTS [optional $^2$] |
| Foreign Handover Command [optional parameter set $^2$] |
| System Type (Foreign Type 1, Foreign Type 2, ...) |
| "Handover Command" (as specified by the foreign system) |

FIGURE 14

Alternative 6b-General Alternative, UMTS cells are treated differently.

| |
|---|
| Message discriminator = "Handover Command" |
| • • • |
| Target Cell n |
| Cell Type (UMTS, Foreign Type, Foreign Type 2, ...) |
| Cell Identifier (as specified by the foreign system) |
| Target Cell n+1 |
| Cell Type (UMTS, Foreign Type, Foreign Type 2, ...) |
| Cell Identifier (as specified by the foreign system) |
| Target Cell n+2 |
| Cell Type (UMTS, Foreign Type, Foreign Type 2, ...) |
| Cell Identifier (as specified by the foreign system) |
| • • • |

FIGURE 15

Alternative 7a-General Alternative, UMTS cells are treated as any cell.

| |
|---|
| Message discriminator = "Handover Command" |
| ⋮ |
| UMTS Target Cell n |
| Cell Identifier (according to the UMTS specification) |
| UMTS Target Cell n-1 |
| Cell Identifier (according to the UMTS specification) |
| UMTS Target Cell n-2 |
| Cell Identifier (according to the UMTS specification) |
| ⋮ |
| Foreign Target Cell n |
| Cell Type (Foreign Type 1, Foreign Type 2) |
| Cell Identifier (as specified by the foreign system) |
| Foreign Target Cell n-1 |
| Cell Type (Foreign Type 1, Foreign Type 2, ...) |
| Cell Identifier (as specified by the foreign system) |
| Foreign Target Cell n-2 |
| Cell Type (Foreign Type 1, Foreign Type 2, ...) |
| Cell Identifier (as specified by the foreign system) |
| ⋮ |

FIGURE 16

Alternative 7b-Optimisedl Alternative, UMTS cells are treated differently.

INTER-SYSTEM HANDOVER—GENERIC HANDOVER MECHANISM

FIELD OF THE INVENTION

This invention relates to mobile radio systems and in particular mobile radio handoff procedures.

BACKGROUND AND SUMMARY

The first public mobile radio systems were introduced in the late 1970's and early 1980's. As a group, those now well-known systems were referred to as "first generation" systems. They included the "Advanced Mobile Phone System" (AMPS) in the United States, "Nordic" in Scandinavia, "Total Access Communications System" (TACS) in Britain, and "Nippon Mobile Telephone System" (NAMTS) in Japan. They had certain transmission characteristics that were generally common to all, such as analog frequency modulation at the radio and digital control at the network. Otherwise, however, each system used a communication standard unique to itself in comparison to the others.

The so-called "second generation" mobile radio systems began their introductions in the mid- to late-1980's. The first of these was the "Group Special Mobile" (GSM) system which became the standard in Europe. The United States followed with "Digital AMPS" (DAMPS), the TDMA version of which was sometimes referred to by its standardization name, "IS-54." The Japanese second generation system was called "Personal Digital Cellular" (PDC). Each of these systems had their own peculiar transmission characteristics and channel conditioning.

Presently, a number of initiatives are being proposed for the "third generation" of mobile radio systems. European third generation system research is being coordinated by the "Universal Mobile Telephone System" (UMTS) initiative, which is studying various proposals including wide-band CDMA (WCDMA), improved TDMA, hybrids, etc. Japanese initiatives for third generation are called "IMT-2000" and are focusing on wide-band CDMA. "Future Public Land Mobile Telecommunications System" (FPLMTS) is another proposed third generation network.

Mobile phones for the third generation systems will be intelligent multi-mode terminals for communication with first, second and/or third generation systems. A basic problem arises, however, in designing the third generation systems in that they must be backward compatible with all second generation systems. If a third generation system is to communicate solely with a like kind of second generation system, the modifications may be straightforward. However, cooperation between countries employing disparate second generation systems is increasing. The European standards organization, ETSI, and the Japanese standards organizations, TTC and ARIB, are suggesting hand-off capability for third generation systems to both the European second generation system (GSM) and the Japanese second generation system (PDC).

PDC and GSM protocols (as well as other second generation systems) are unique to each other. GSM as well as PDC, specifies frequencies (f) and time slots (TS) in a way unique to each system, second generation systems employing CDMA specify appropriate codes, and other second generation systems use other kinds of protocol specifications. These protocols for second generation systems are well-known throughout the industry. In the example case of PDC and GSM compatibility to third generation UTMS, the PDC and GSM specifications can be adapted to provide forward compatibility. So too can UMTS specifications be adapted for backward compatibility. In the case of UMTS, however, the standard will have to be compatible to multiple different kinds of second generation communications protocols, depending upon the type of second generation system a UMTS network is in communication with at any given time.

The problem is particularly keen as it relates to hand-off procedures. As a mobile radio is handed off from a UMTS service area to a PDC service area, for example, the protocol change must be accommodated from the third generation system characteristics to the PDC second generation characteristics. The same would be true if the mobile radio signal connection was handed from a UMTS system to any other second generation system. Thus, in the above example, the UMTS would be required to communicate to PDC networks in a PDC compliant protocol, to a GSM network in a GSM compliant protocol, etc. The third generation system ends up supporting multiple mechanisms, namely PDC and GSM (among potentially others).

Previously, when systems were upgraded from first generation to second generation, backward compatibility was an issue that was addressed. Handoff techniques from, for example, analog signaling to digital signaling, were accommodated through various techniques. Such techniques included, for example, signal acquisition, modulation, and re-alignment (re-synchronization) aspects. These techniques were thus highly content-specific, requiring newer generational system to be fully, substantively conversant with previous generational systems. Content-specific AMPS to DAMPS handovers were also developed to accommodate first generation to second generation system upgrading. Such prior handoff systems did not address the problems associated with handing off signals from a new generation of system to multiple different kinds of previous generation systems.

The technology disclosed herein provides a highly efficient way of ensuring that handoffs from third generation systems to multiple different kinds of second generation systems is done efficiently and without disruption. Thus, for example, third generation UMTS systems can ensure communication with any kind of second generation system, including DAMPS, GSM, PDC, etc.

In accordance with a preferred example embodiment, a generic mechanism is provided to accommodate inter-system handovers between third generation systems and any other type of system including any type of second generation system. The generic mechanism includes a standardized data "container" structure that will include whatever information is necessary to specify a communication to a neighboring cell system in the communication language (whether common or foreign) of that neighboring cell system. Thus, for example, if a handover to a GSM neighboring cell is to occur, the container may specify the communication parameters for a GSM transmission. On the other hand, if the neighboring cell is PDC specific, the container may specify the communication parameters for a PDC transmission. Any other types of third, second, first, or other communication parameters can also be specified in the container. Using the container, the recipient of the handover can specify the communication parameters to the mobile radio, and the mobile radio can specify its capabilities to the neighboring cell using the proper parameters. Importantly, the current cell (for example, third generation) need not read and interpret the content of the particular second generation parameters in the container, provided it simply delivers the container to the neighboring cell for evaluation. In this way, the third generation system need not understand all previous generation protocols and the recipient second (or first) generation system is fooled into believing that it is communicating with another second (or first) generation system.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which.

DETAILED DESCRIPTION

The following example embodiment is described with respect to second generation systems such as GSM and PDC and third generation systems such as UMTS. However, the fundamental aspects of the technology disclosed herein are more generically applicable to all kinds of foreign system handovers. The preferred embodiment of the technology disclosed herein is employed in combination with multi-mode mobile phones, i.e., mobile phones capable of communicating with at least two different types of mobile phone systems under corresponding multiple different types of communication protocol standards. Such multi-mode mobile phones can communicate with two or more of, for example, GSM, PDC, UMTS, etc. systems. The preferred example embodiment of the technology disclosed herein will have equal applicability to all types of multi-mode mobile phones presently available and developed in the future. That is, the technology disclosed herein provides a generic mechanism for intersystem handover, regardless of the communication protocol specification of the systems involved in the handover, or the type of multi-mode mobile radio employed.

A preferred example embodiment of the technology disclosed herein involves a generic mechanism to provide inter-system handovers between a UMTS system and a GSM or PDC system. This occurs when, for example, a mobile phone in a UMTS service area is handed over to a cell being supported by a GSM or PDC system. In such a case, the dual- (or multi-) mode mobile phone communicates with the UMTS system in accordance with UMTS protocols and is also capable of communicating with the GSM and PDC systems in accordance with their respective protocols.

As used herein, the term multi-mode mobile phone shall mean dual-mode mobile phones and other mobile phones capable of community according to two or more different communication protocols.

Figure 1A:
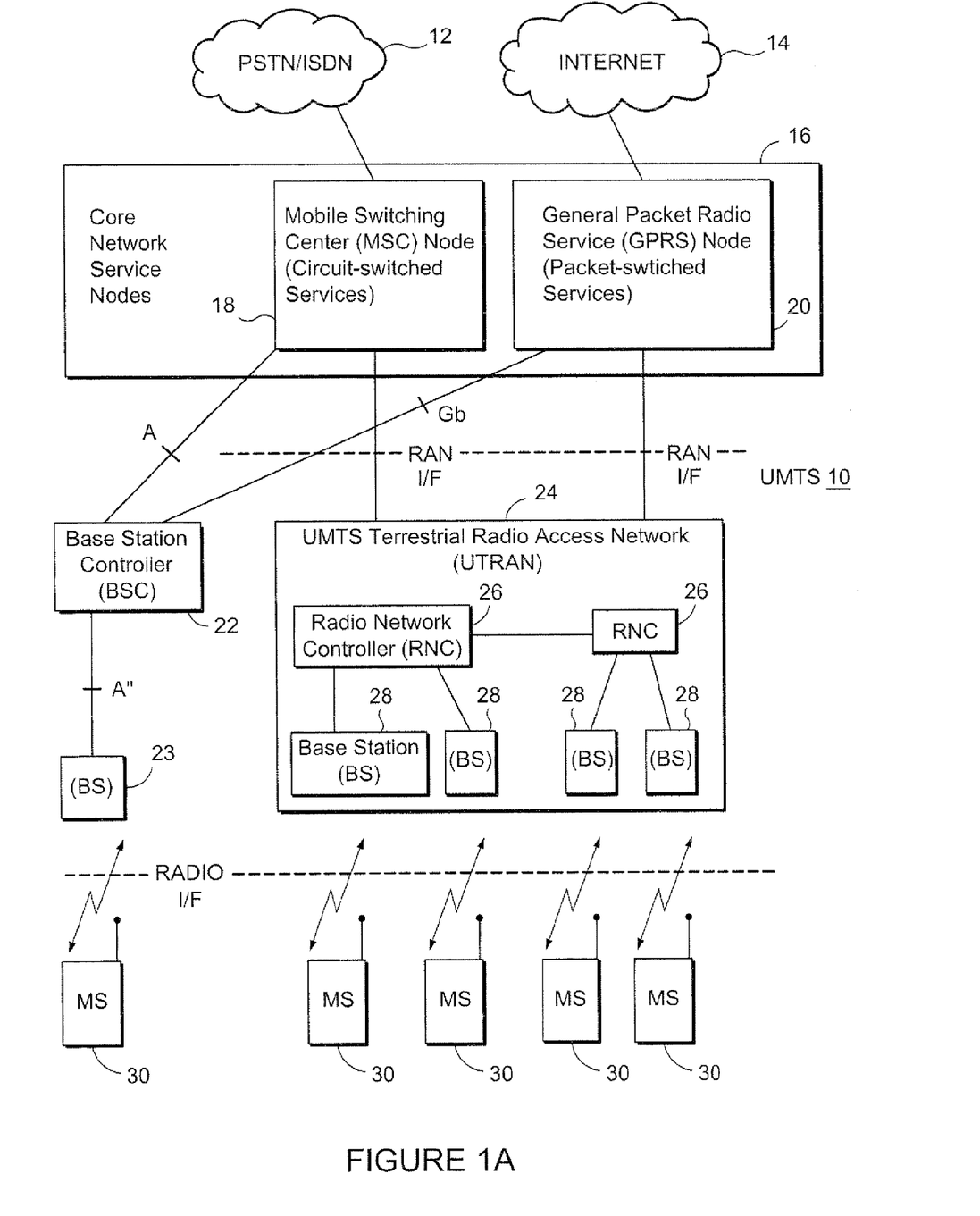
FIG. 1A is a schematic presentation of an example mobile radio system.

An example mobile radio system structure is shown in FIG. 1a. In this particular structure, a third generation UMTS system 10 is shown as including mobile stations 30 communicating over a radio interface to base stations 28. Base stations 28 are included within UMTS terrestrial radio access network UTRAN which includes both radio network controllers 26 and base stations 28. Similarly, mobile stations 30 can communicate through base station 23 to base station controller BSC 22. However, the base stations 23 and BSC 22 are not part of UMTS, as seen in FIG. 1B.

The BSC 22 and UTRAN 24 communicate via interfaces "A" and "Gb", and "RAN IF" to respective core network service nodes. These nodes include the mobile switching center MSC 18 for circuit switched services and general packet radio service node GPRS 20 for packet switch services. These nodes in turn communicate with public service telephone network/ISDN node 12 or Internet node 14, respectively.

As depicted in FIG. 1A, base station system 22 and base station 23 may comprise a second generation cellular system such as GSM or PDC. Mobile station 30 communicating with the base station 23 will employ an appropriate GSM or PDC protocol format for such communications. By the same token, mobile stations 30 in communication with the UMTS terrestrial radio access network 24, i.e., a third generation cellular system, communicate with the network via a UMTS standard protocol. When mobile stations move from a cell serviced by base station 28 to a cell serviced by base station 23, a handoff is created between a third generation system to a second generation system. In such cases, the mobile stations 30 must be multi-mode mobile radios capable of communicating in both second generation protocols and third generation protocols.

Figure 1B:
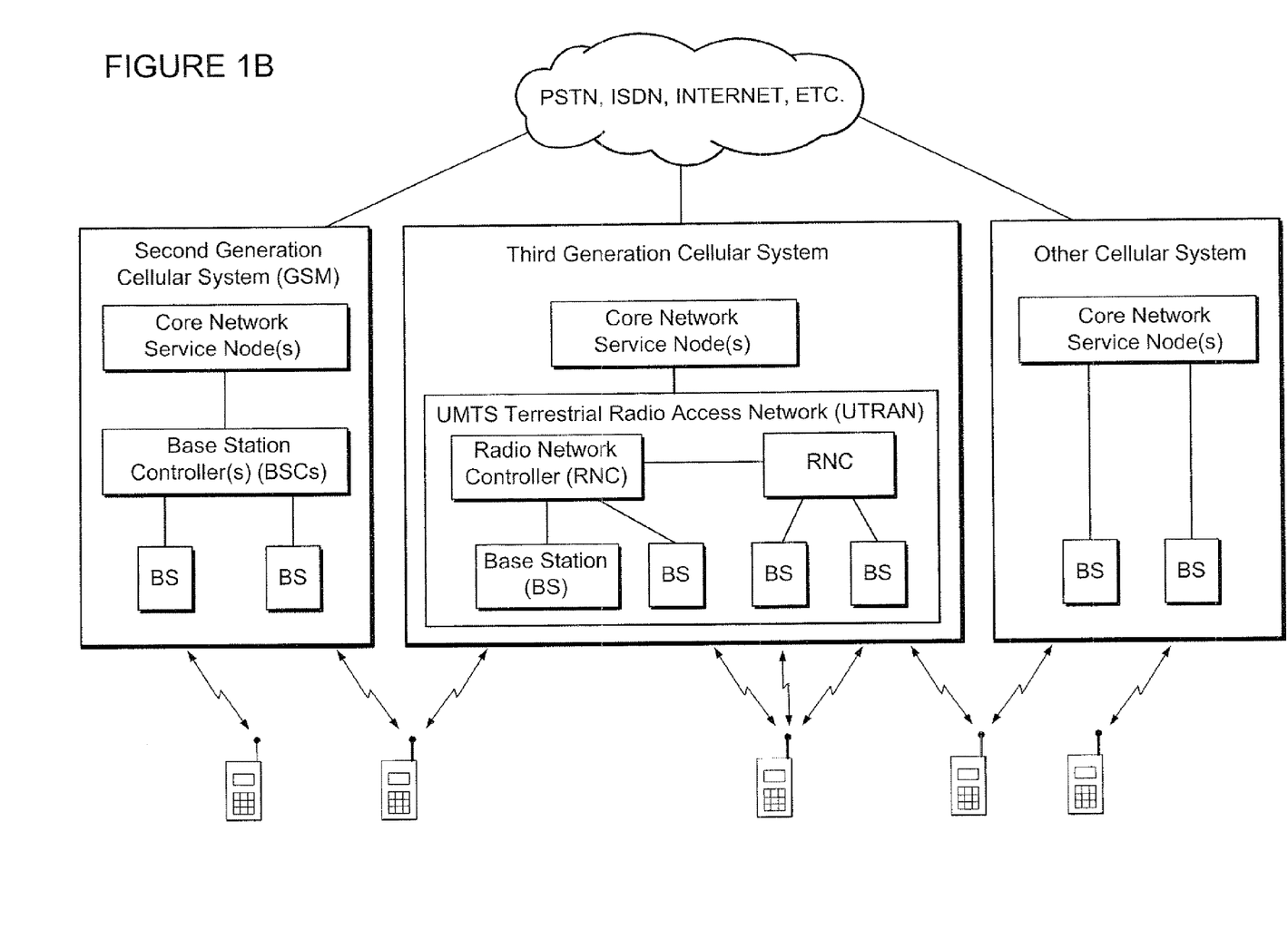
FIG. 1B is a schematic depiction of an example mobile radio system including multi-generational systems.

FIG. 1B is a schematic representation of an extension of FIG. 1A in which mobile radios communicate with second generation systems, third generation systems, and any other type of cellular system presently available or available in the future. In such cases, the coordination of communication between these systems is made more effective and efficient through use of the technology disclosed herein.

The technology disclosed herein recognizes that the third generation cellular system of, for example FIGS. 1A and 1B, in order to effectuate a handoff procedure, must be capable of communicating the handoff requirements to and from the disparate cellular systems to which the handoff is occurring. One way to do this is to educate the third generation system about the communication protocols for each and every previous generation cellular system to which handoff may occur. Such a task is daunting given the possible numbers of second generation systems (and other prior systems) to which the third generation cellular system may have to handoff a mobile radio communication.

The technology disclosed herein provides a more generic mechanism that allows system handovers from third generation cellular systems to any other type of system.

There are several different types of communication between the network and the mobile radio that should have the generic support offered by the technology disclosed herein in order to solve the problem identified. In reference to FIG. 2, some of these kinds of communications are discussed. With respect to FIG. 2, a second generation base station is shown on the left side of the Figure, and a dual-mode (or multi-mode) mobile station is shown on the right. Between the dual-mode mobile station and the second generation base station is the UMTS terrestrial radio access network UTRAN which is servicing the cell in which the mobile stations are currently communicating. In the embodiment shown in FIG. 2, the mobile station is preparing to be handed off from the UMTS cell through the core network CN structures to a cell serviced by the second generation base station shown on the left of FIG. 2. Thirteen different communications are described in FIG. 2 in order to illustrate the generic mechanism used by the technology disclosed herein with respect to certain of these communications.

Figure 2:
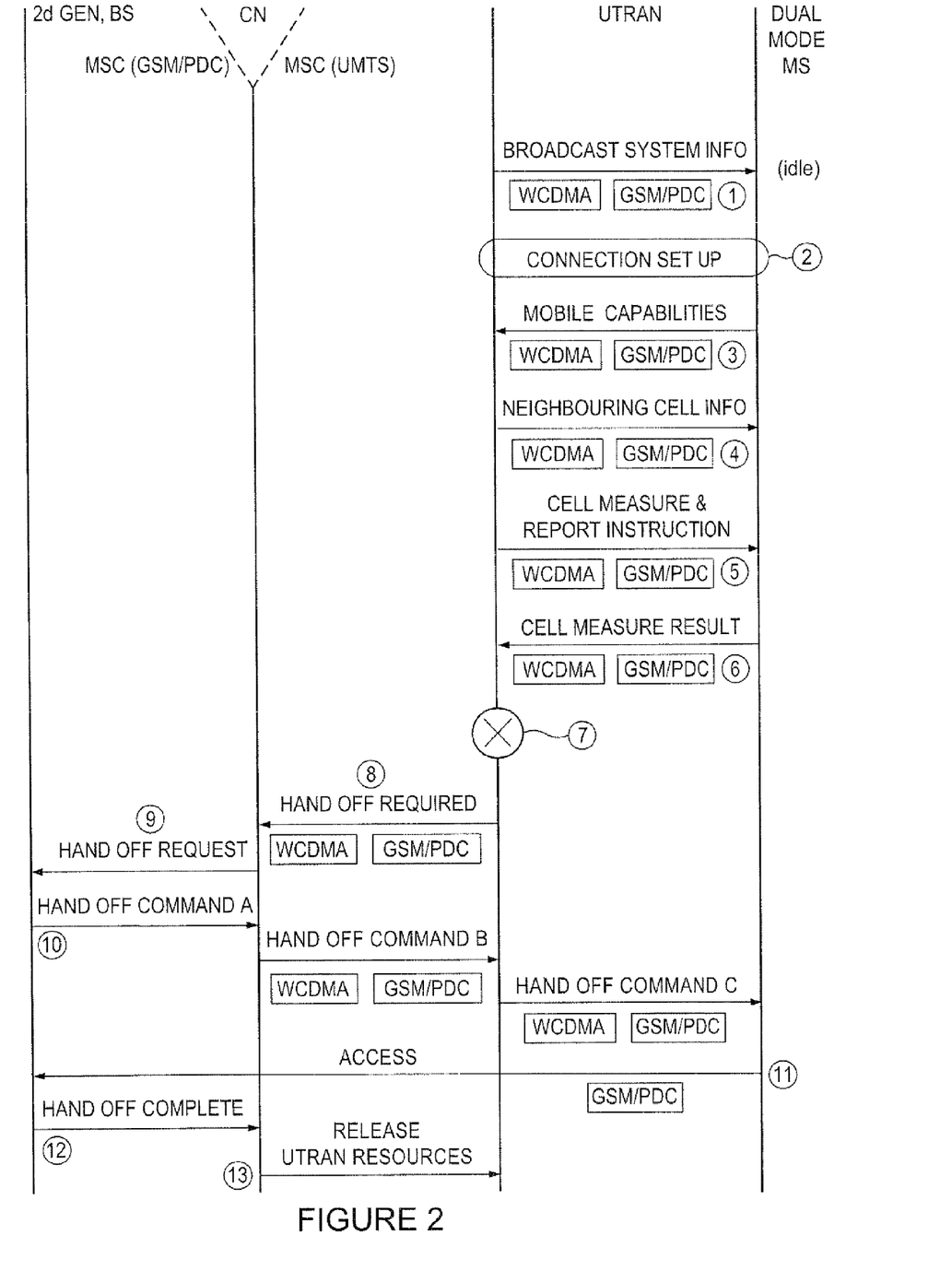
FIG. 2 is a communication sequence depiction in accordance with a preferred example embodiment of the present invention.

Communication step 1 in FIG. 2 is a broadcast of system information from the UMTS system to the mobile stations acting in otherwise idle mode, i.e. to single mode mobile stations as well as multi-mode mobile stations. In this communication step 1, the network supplies the mobile station in idle mode (i.e., not in communication with the network except through receipt of the broadcast information on the control channel of a cell) with neighboring cell information for at least the cell serviced by the second generation base station on the left of FIG. 2. As shown in step 1, the broadcast system information from the third generation UTRAN can include information in a so-called "container" (described in more detail following) telling the dual-mode mobile stations that handoff capabilities are available in WCDMA mode (third generation) or in any other kind of second generation mode (GSM/PDC). Of course, the UTRAN communicates with the dual-mode mobile station in the third generation wideband CDMA mode (WCDMA), not in the GSM/PDC/ Other protocol, but simply identifies to the dual-mode mobile station that container capability is available through the UTRAN for handoff to other than third generation systems.

After the broadcast system information is sent in step 1, a connection setup procedure is developed in step 2 between the UTRAN and the mobile station. This follows standard connection setup procedures between the network and the mobile station.

In step 3, the mobile radio provides the network with an indication of its radio related capabilities. The mobile radios make this communication to the third generation UTRAN, in this example in WCDMA mode. As part of its capabilities information, the mobile station may also communicate to the network that it is capable of communicating in GSM/PDC/ Other modes as well. This information containing the dual-mode aspects of the mobile station is included in the return "container" from the mobile station to the network, as described in more detail below.

In step 4 of FIG. 2, the network, which now knows that the mobile station can operate in dual-mode based on the capabilities provided to it in step 3, provides the mobile station with neighboring cell information. This transmission to the mobile station will include the container information for neighboring cells, whether they are like generation or foreign generation systems.

In step 5, the network provides the mobile station with measurement control information and instructions. Again, this information will include the container for foreign cell measurement control information, as described in more detail below.

Thereafter, the mobile station takes the measurements it was instructed to take from the neighboring cells. The results of the measurements are reported to the network in step 6. These measurement reports for neighboring cells include the container for measurements on the foreign neighboring cells, as described below.

In step 7, the network makes the decision whether to handoff the mobile station to a foreign neighboring cell. Once the decision is made to handoff, the third generation network UTRAN initiates a handoff command through the appropriate core network in step 8 to the foreign neighboring cell base station in step 9. In the case of FIG. 2, the foreign neighboring cell is a second generation base station, which issues a handoff command at step 10 back to the core network. The core network relays the handoff command as "Handoff Command B" to the third generation network UTRAN, which in turn delivers the "Handoff Command C" to the mobile station.

Steps 9 and 10 could also be via another MSC, in the same or a different network. The technology disclosed herein is not limited to a particular network architecture, e.g. an architecture with MSCs and BSs. This architecture is herein only used as an example.

Thereafter, the mobile station is handed off to the second generation base station and therefore begins communication in the second generation protocol (for example, GSM or PDC), in step 11. Finally, the second generation base station (or another second generation node relevant to that particular second generation system architecture) informs the core network that the handoff is complete in step 12 and the core network releases the third generation system resources in step 13.

The presently preferred example embodiment provides generic support between the third generation and second generation systems of, for example, FIG. 2 by providing the generic container mechanisms identified above to support several of the communications described in FIG. 2. In particular, non-generational (i.e., generic) support is required for the control channel broadcast information (step 1), the mobile capabilities communication (step 3), the neighboring cell information communication (step 4), the cell measurement and reporting instruction (step 5), the cell measurement result communication (step 6), and the handoff command C. In these cases requiring generic support, there is a need for communication between the third generation network in the mobile station regarding information from a foreign system. For example, in FIG. 2, if the second generation base station is a GSM system, the UMTS must communicate with the mobile station regarding foreign GSM information.

There may also be cases of communication with the network that share the same requirement for generic support described above, for example, when transferring a request for handover to another system between a radio network node (RAN node) and a core network node (CN node) or when transferring a handover command between a CN node and a RAN node.

The solution for providing generic communication capabilities between disparate systems is to provide "containers" for foreign system information in a communication transmission. The generic containers allow a non-conversant third generation system to avoid learning multitudes of bilaterally specific procedures in order to communicate second generation (or other generation) information to a dual-mode mobile station, or vice a versa. Examples of how these containers are employed in the generic communications of FIG. 2 are shown in detail in FIGS. 3 through 16.

Figure 3:
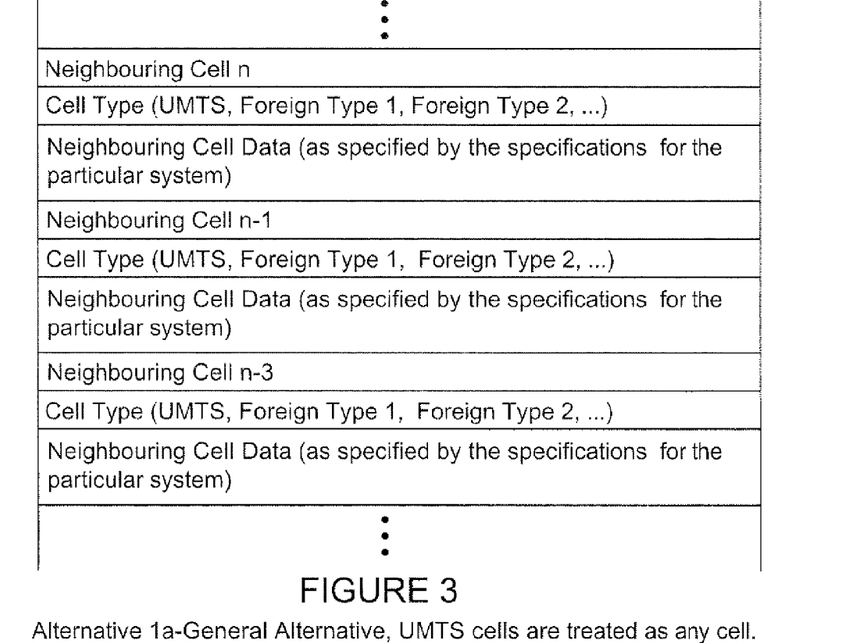
FIG. 3 is a representation of broadcast system information from a network to a mobile station (third generation cells treated like foreign generation cells)
Figure 4:
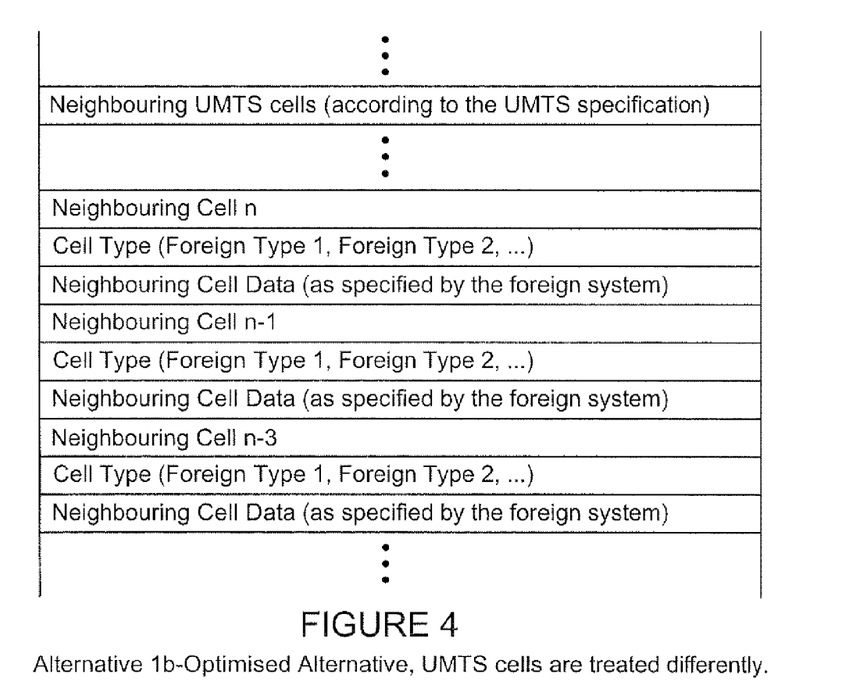
FIG. 4 is a representation of broadcast system information from a network to a mobile station (third generation cells treated differently compared to foreign generation cells)

FIGS. 3 and 4 are example embodiments of the broadcast system information communication (step 1) of FIG. 2. FIG. 3 is an embodiment in which third generation cells are treated as any other cell and FIG. 4 is an example of third generation cells being treated differently from foreign cells.

Figure 5:
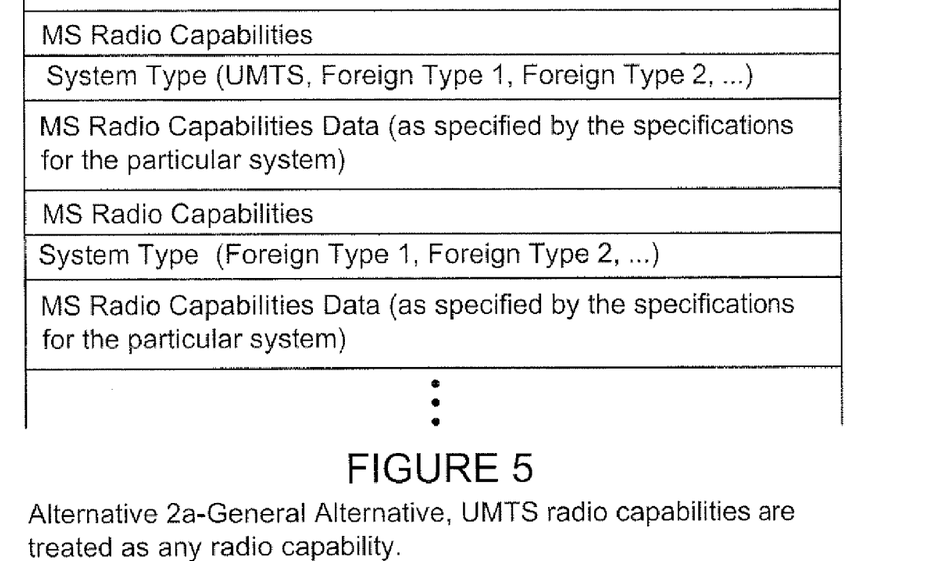
FIG. 5 is a representation of mobile capabilities information communicated from the mobile station (third generation cells treated like foreign generation cells)
Figure 6:
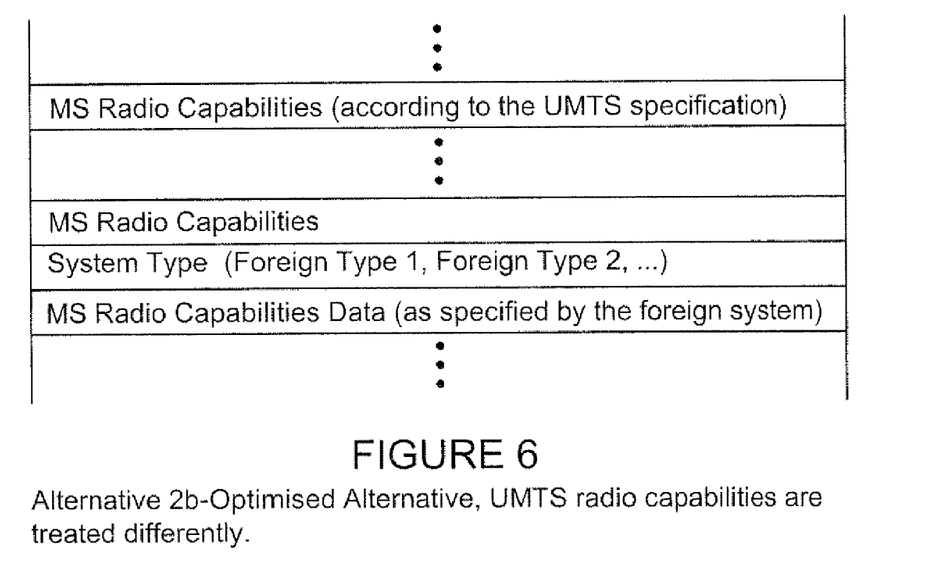
FIG. 6 is a representation of mobile capabilities information communicated from the mobile station (third generation cells treated differently compared to foreign generation cells)

FIGS. 5 and 6 are example embodiments of the mobile capabilities communication (step 3) of FIG. 2. FIG. 5 is an embodiment in which third generation cells are treated as any other cell and FIG. 6 is an example of third generation cells being treated differently from foreign cells.

Figure 7:
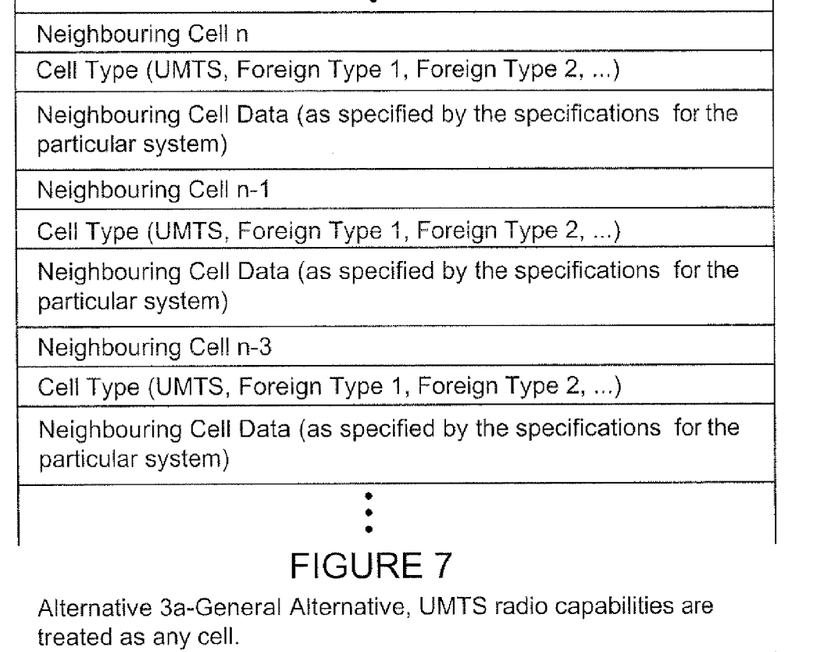
FIG. 7 is a representation of neighboring cell information communicated from the network (third generation cells treated like foreign generation cells)
Figure 8:
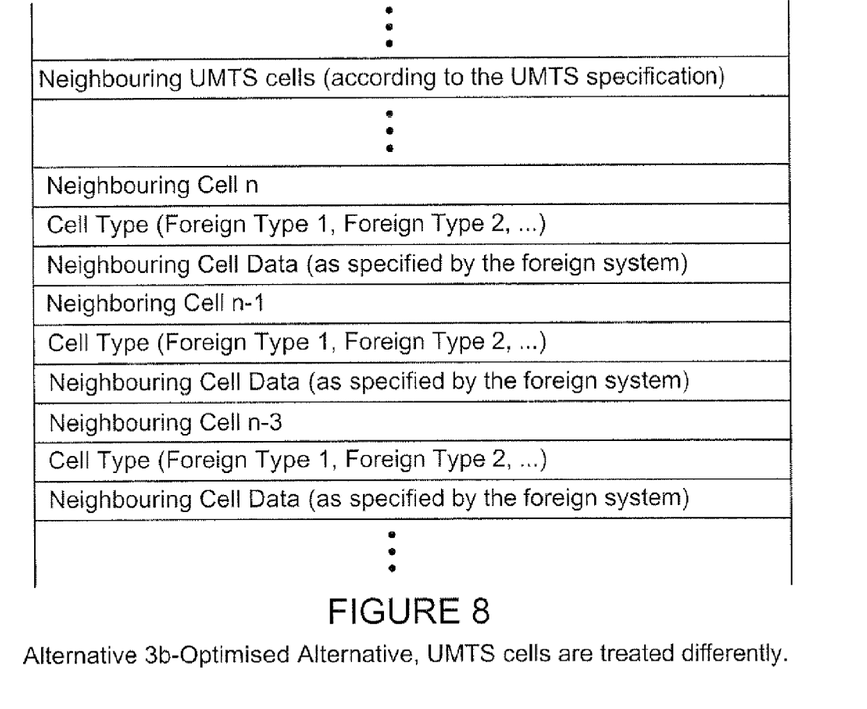
FIG. 8 is a representation of neighboring cell information communicated from the network (third generation cells treated differently compared to foreign generation cells)

FIGS. 7 and 8 are example embodiments of the neighboring cell information communication (step 4) of FIG. 2. FIG. 7 is an embodiment in which third generation cells are treated as any other cell and FIG. 8 is an example of third generation cells being treated differently from foreign cells.

Figure 9:
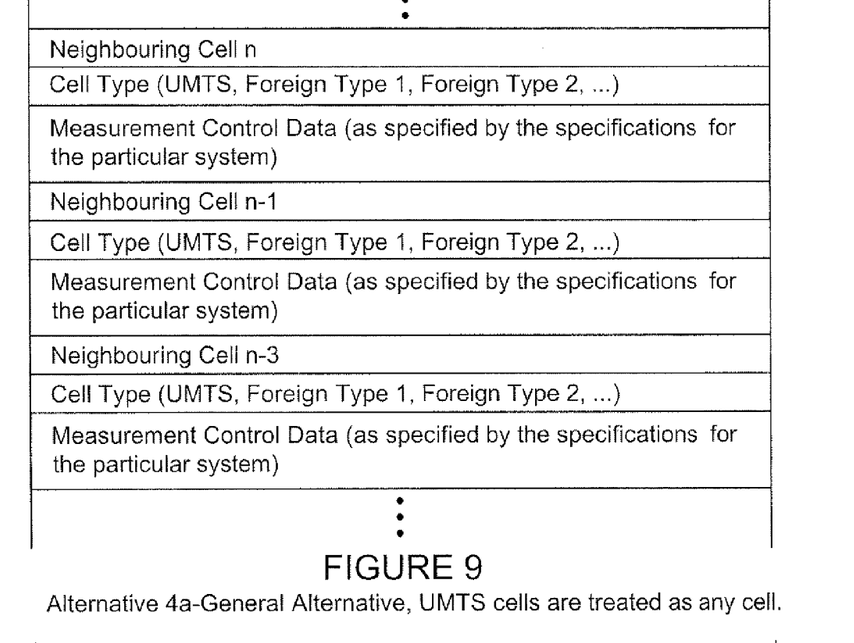
FIG. 9 is a representation of measurement instruction information communicated from the network (third generation cells treated like foreign generation cells)
Figure 10:
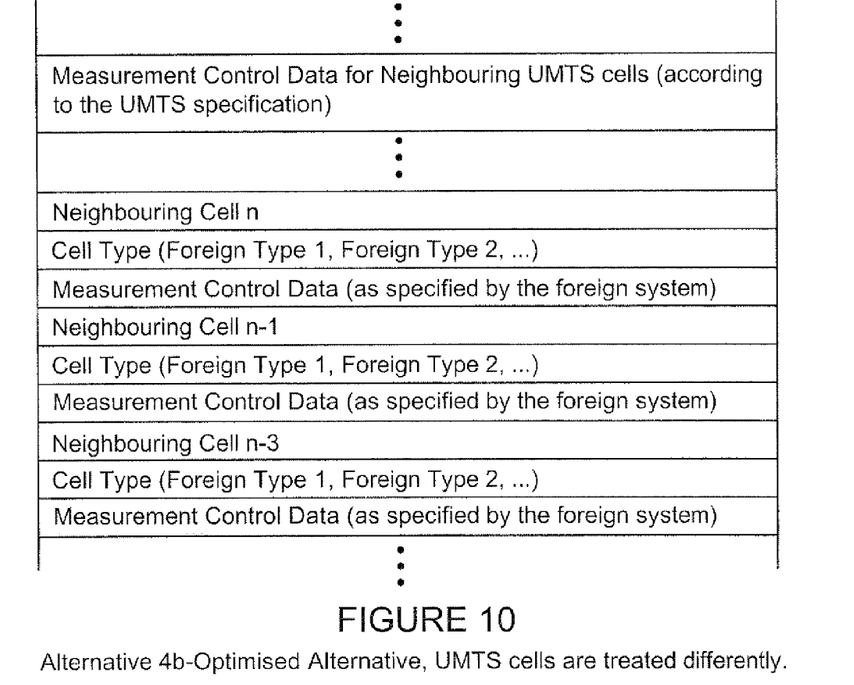
FIG. 10 is a representation of measurement instruction information communicated from the network (third generation cells treated differently compared to foreign generation cells)

FIGS. 9 and 10 are example embodiments of the cell measurement instruction (step 5) of FIG. 2. FIG. 9 is an embodiment in which third generation cells are treated as any other cell and FIG. 10 is an example of third generation cells being treated differently from foreign cells.

Figure 11:
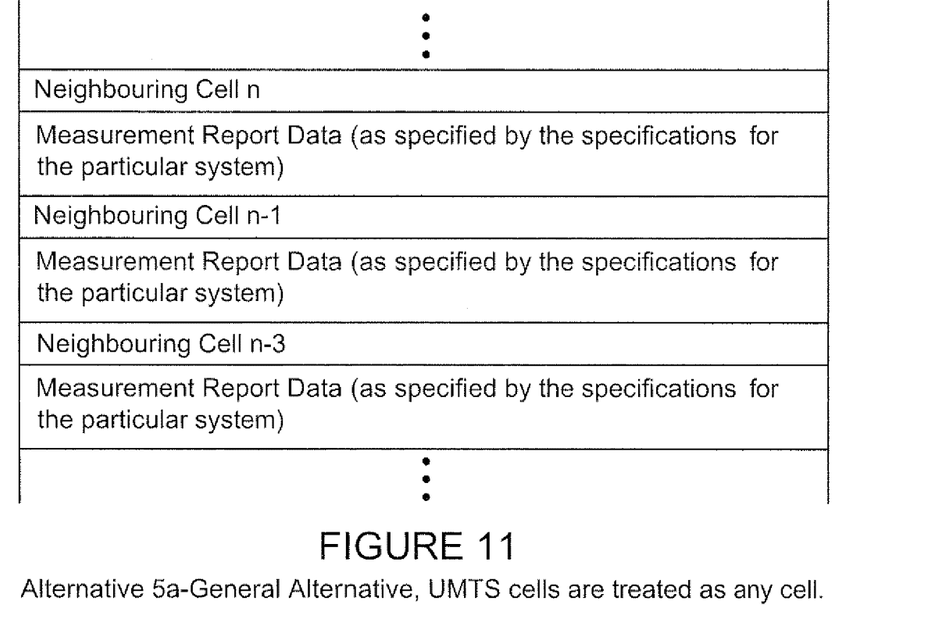
FIG. 11 is a representation of cell measurement report information communicated from the mobile station (third generation cells treated like foreign generation cells)
Figure 12:
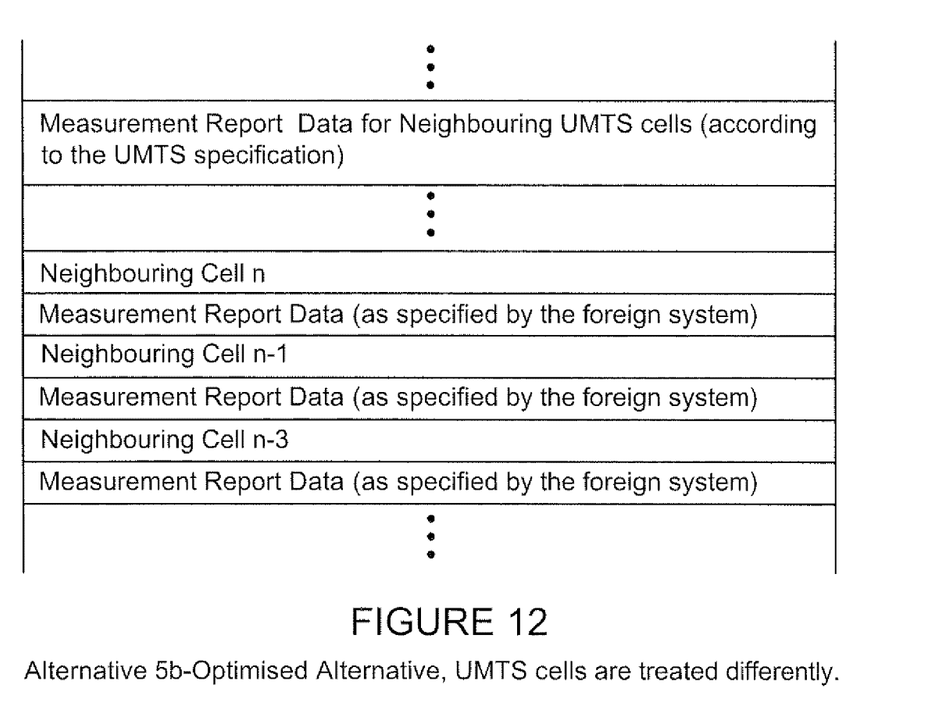
FIG. 12 is a representation of cell measurement report information communicated from the mobile station (third generation cells treated differently compared to foreign generation cells)

FIGS. 11 and 12 are example embodiments of the cell measurement result (step 6) of FIG. 2. FIG. 11 is an embodiment in which third generation cells are treated as any other cell and FIG. 12 is an example of third generation cells being treated differently from foreign cells.

Figure 13:
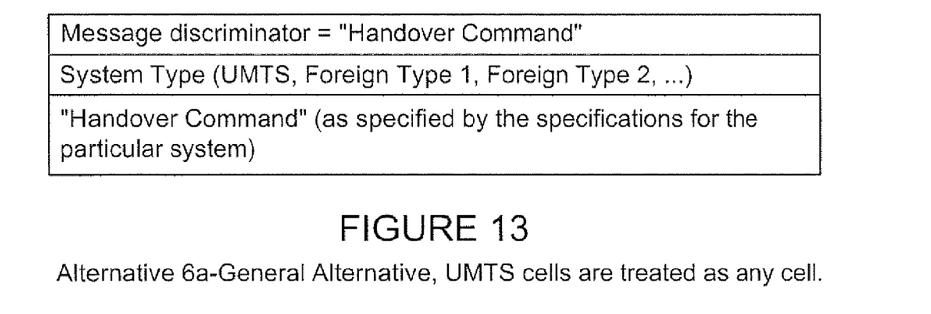
FIG. 13 is a representation of handoff command information communicated from the network (third generation cells treated like foreign generation cells)
Figure 14:
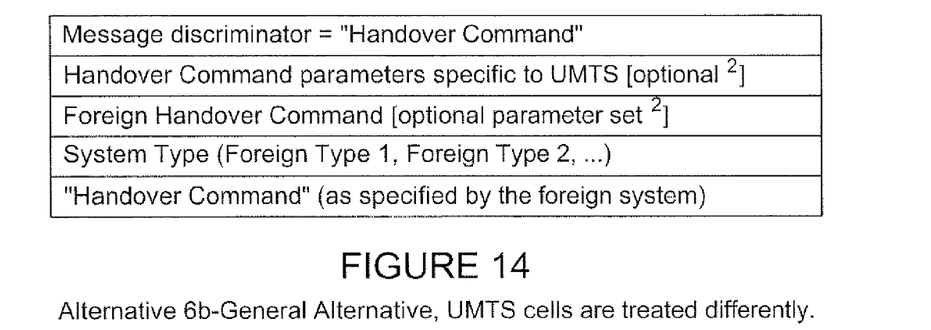
FIG. 14 is a representation of handoff command information communicated from the network (third generation cells treated differently compared to foreign generation cells)

FIGS. 13 and 14 are example embodiments of the handoff command communication ("Handoff Command B" as well as "Handoff Command C") of FIG. 2. FIG. 13 is an embodiment in which third generation cells are treated as any other cell and FIG. 14 is an example of third generation cells being treated differently from foreign cells.

Figure 15:
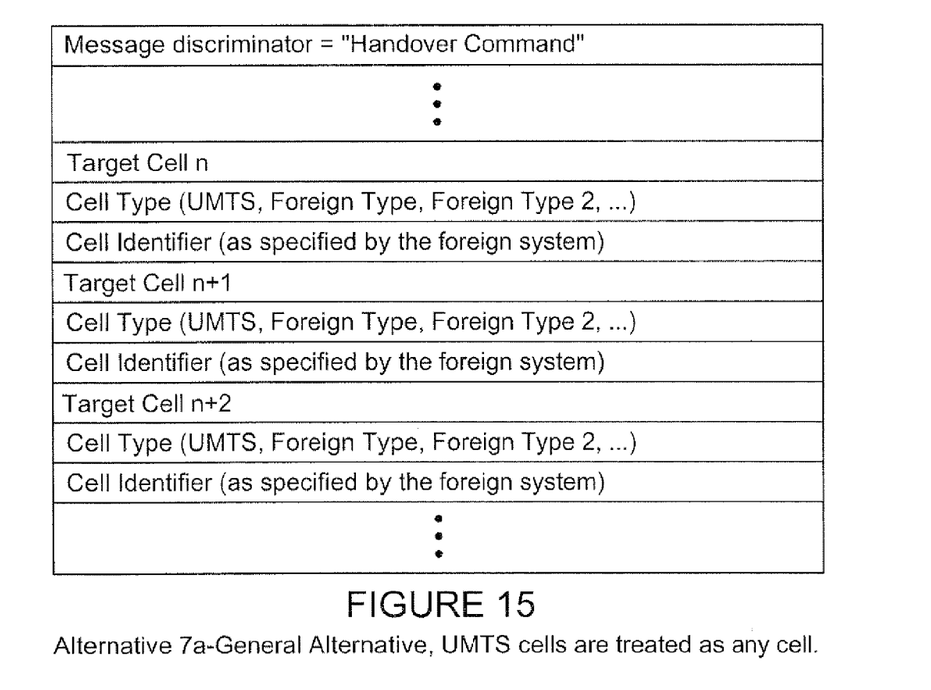
FIG. 15 is a representation of inter-network handoff information communicated from an RAN to a CN; (third generation cells treated like foreign generation cells)
Figure 16:
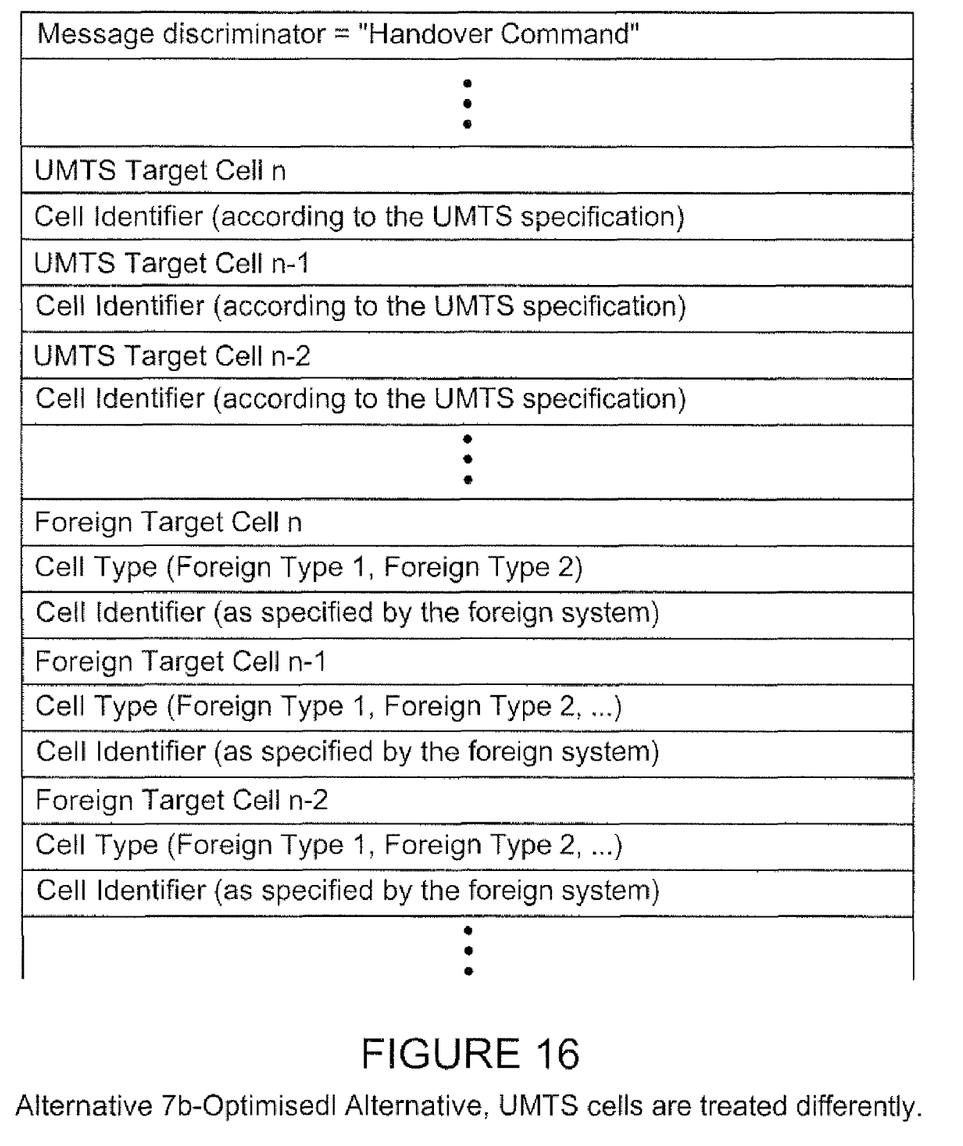
FIG. 16 is a representation of inter-network handoff information communicated from an RAN to a CN (third generation cells treated differently compared to foreign generation cells).

FIGS. 15 and 16 are example embodiments of the inter-network handoff communications with CN (step 8) of FIG. 2. FIG. 15 is an embodiment in which third generation cells are treated as any other cell and FIG. 16 is an example of third generation cells being treated differently from foreign cells.

In FIGS. 3 and 4, the neighboring cell information broadcasted to the mobile station on the control channel in step 1 includes the container for the foreign neighboring cells as the "neighboring cell data (as specified by the specifications for the particular system)" of FIG. 3 and "neighboring cell data (as specified by the foreign system)" of FIG. 4. A container structure is provided within the data map for each neighboring cell reported. This container is structurally generic to any communication protocol and content-specific to the communication protocol of the particular cell being reported on.

In FIGS. 5 and 6, the transfer of mobile station capabilities of step 3 of FIG. 2 includes the container of capabilities related to the foreign system. This is shown in FIG. 5 as the "MS radio capabilities data (as specified by the specifications for the particular system)," and in FIG. 6 as the "MS radio capabilities data (as specified by the foreign system)," One container is provided for each mobile radio capability reported to the network.

In FIGS. 7 and 8, the neighboring cell information is provided by the third generation network to the mobile station and includes the container for foreign neighboring cells. This is shown in FIG. 7 as "neighboring cell data (as specified by the specifications for the particular system)" and in FIG. 8 as "neighboring cell data (as specified by the foreign system)." A generic container is provided for each reported neighboring cell to include whatever content-specific protocol data is particular to the system type of each neighboring cell.

FIGS. 9 and 10 relate to the cell measurement and reporting instruction (step 5) of FIG. 2 and provide the mobile station with a container for foreign measurement control information. This is shown in FIG. 9, for example as "measurement control data (as specified by the specifications for the particular system)" and in FIG. 10 as "measurement control data (as specified by the foreign system)." Containers are provided for each of the neighboring cells being reported upon and will contain data characteristic of the cell type being reported upon.

FIGS. 11 and 12 relate to the measurement reporting for neighboring cells by the mobile station in step 6 of FIG. 2. These measurement reports include the container for measurements on foreign neighboring cells as shown in FIG. 11 as "measurement report data (as specified by the specifications for the particular systems)" and in FIG. 12 as "measurement report data (as specified by the foreign system)." Containers are provided for reporting measurement data for each of the cells reported upon by the mobile station.

FIGS. 13 and 14 relate to the "Handoff Command C" of FIG. 2, which is the command sent to the mobile station from the network ordering the mobile station to switch to the new cell (new channel). This command includes the container for the chosen foreign cell (channel) to which the mobile station is switching. Thus, if the second generation base station on the left of FIG. 2 has been chosen for the handoff and is a GSM system, the Handoff Command C will include a container having GSM data written by the GSM network informing the mobile station about the appropriate GSM communication protocol characteristics. For example, in the case of GSM, the second generation system will provide the dual-mode mobile station with at least the appropriate frequency, time slots, and maximum power characteristics for the GSM transmissions. In FIG. 13, the container is shown as "'handover command' (as specified by the specifications for the particular systems)" and in FIG. 14 as "'handover command' (as specified by the foreign system)". FIGS. 13 through 14 contain only a single container because the cell to which handoff is occurring has been selected and other neighboring cells are no longer in the communication loop. Accordingly, the container of FIGS. 13 and 14 will include the handover command in accordance with the specifications dictated by the cell protocol for the selected cell to which the handover is occurring.

As can be seen from the depictions in FIGS. 3 through 14, the preferred example embodiment provides a data container having a structure common within third generation systems, second generation systems, etc. in order to transmit foreign data types through any particular system to a destination equipment that can read and understand the information provided in the container. With this embodiment, the third generation system need not consider the contents of the container per se, but can simply hand the contents to the mobile station which can read and understand them as needed. Unlike the mobile station, the third generation network need not have the capability to read or act on the communication protocols of the foreign systems to which handoff is occurring but instead act simply as a conduit to deliver the container of foreign system information to the dual-mode mobile station.

There are also instances of communication within the network itself that share the same problem that can be efficiently remedied with the generic container mechanisms described above. Such inter-network communications include the transferring of a request for a handover to another system as between a radio access node RAN node and a core network CN node. FIGS. 15 and 16 show example data maps for communications such as these inside the network. In FIGS. 15 and 16, as examples, when a handover is required, the radio access network sends a request for that handover to the core network in accordance with the mappings of FIGS. 15 and 16. Each target cell inquiry includes a container for "cell identifier (as specified by the foreign system)" in FIG. 15. Again, this container provides a generic data mechanism that can be communicated by the third generation system to a second generation system but contains information that is foreign-system specific (which the third generation system need not necessarily comprehend). FIG. 16 differs from FIG. 15 in that the third generation cells are treated independently from foreign system cells. In the third generation cells, the container will always include third generation specific, "cell identifier (according to the UMTS specification)." On the other hand, the foreign target cell containers will include whatever foreign system specific information is appropriate within the generic container structure, "cell identifier (as specified by the foreign system)." In FIG. 2 not only the communication from the UTRAN to the CN but also the communication from the CN to the UTRAN when CN sends the "Handoff Command B" to UTRAN can be made efficiently with the generic container mechanism. The FIGS. 13 and 14 could be seen as an example not only on the "Handoff Command C" but also as an example of the "Handoff Command B."

In the above example embodiments, UMTS, GSM, and PDC systems are described as examples only. The present container structure is not limited to any one of these systems, but may be employed in any type of currently available system or in future generations of mobile radio systems.

The technology disclosed herein has the advantage that each of the unique mobile radio systems may continue to communicate in its own specification. There is no need for additional data mechanisms to be included into each of the particular generational systems in order for them to understand the specifications and protocols of prior or subsequent generational systems. Instead, each generational system simply knows to open the container it receives in order to extract the protocol information that it needs for communications. Where a particular generational system does not need the protocol information of a foreign system, it simply transports the container down the communication stream.

The specifications of the container are not particular to the technology disclosed herein but may be any appropriate data mapping structure provided the structure is generic to all generational systems to which it applies. The contents of the container are, of course, left to the specifications of the particular generational systems in the appropriate cell neighborhoods.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A radio access network having a first communication protocol, said radio access network defining first cells at least some of which neighbor foreign cells employing a foreign communication protocol different from said first communication protocol, said foreign communication protocol associated with a foreign communication system, the radio access network comprising:
   a radio access network node structure for communicating with a multi-mode mobile radio in said first cells;
   a data mechanism for exchanging handover information through said network node structure with said multi-mode radio as said multi-mode radio is to be handed-over to at least one of said foreign cells, said data mechanism comprising a container structure comprising content expressed in the foreign communications protocol so that the node structure can serve as a conduit for the container and need not understand the content of the container structure; and
   wherein the container structure comprises a dedicated data mapped structure generic to said radio access network and said foreign communication system such that said generic data mapped structure transports both handover data content unique to said first communication protocol and handover data content unique to said foreign communication protocol.

2. A mobile radio network is in claim 1, wherein the radio access network node fills the container structure to include broadcast system information.

3. A mobile radio network is in claim 1, wherein the multi-mode radio fills the container structure to include mobile radio capabilities information.

4. A mobile radio network is in claim 1, wherein the radio access network node fills the container structure to include neighboring cell information.

5. A mobile radio network is in claim 1, wherein the radio access network node fills the container structure to include neighboring cell measurement instructions.

6. A mobile radio network is in claim 1, wherein the radio access network node fills the container structure to include neighboring cell measurement instructions.

7. A mobile radio network is in claim 1, wherein the radio access network node fills the container structure to include handoff command information.

8. A radio access network as in claim 1, wherein the content of the container structure comprises communication parameters for the foreign communication system.

9. A radio access network as in claim 8, wherein the communication parameters for the foreign communication system are written by the foreign communication system.

10. A radio access network as in claim 1, wherein the content of the container structure includes a message or command dictated by the foreign communications protocol.

11. A radio access network as in claim 10, wherein the command is a handover command.

12. A radio access network as in claim 1, wherein the radio access network is a Universal Mobile Telephone System (UMTS) radio access network and the foreign communication system is one of a Group Special Mobile (GSM) or Personal Digital Cellular (PDC) communication system.

13. A radio access network as in claim 1, wherein the radio access network is a third generation system and the foreign communication system is second generation system.

14. A mobile radio network, comprising:
- a radio access network having an associated first communication protocol for communicating to a multi-mode mobile radio in first cells serviced by said radio access network according to said first communication protocol;
- a second network having an associated foreign communication protocol for communicating to the multi-mode mobile radio in at least foreign cells neighboring said first cells and serviced by said second network according to said foreign communication protocol, said radio network and said second network being in handoff communication with each other to handoff said mobile radio when said mobile radio commutes from one of said first cells to one of said foreign cells;
- said handoff communication being in accordance with a data mechanism, said data mechanism comprising a container structure comprising content expressed in the foreign communications protocol so that the node structure can serve as a conduit for the container and need not understand the content of the container structure; and
- wherein the container structure comprises a dedicated data mapped structure generic to said radio access network and said foreign communication system such that said generic data mapped structure transports both handover data content unique to said first communication protocol and handover data content unique to said foreign communication protocol.

15. A radio access network as in claim 14, wherein the radio access network node fills the container structure to include broadcast system information.

16. A radio access network as in claim 14, wherein the multi-mode radio fills the container structure to include mobile radio capabilities information.

17. A radio access network as in claim 14, wherein the radio access network node fills the container structure to include neighboring cell information.

18. A radio access network as in claim 14, wherein the radio access network node fills the container structure to include neighboring cell measurement instructions.

19. A radio access network as in claim 14, wherein the mobile radio fills the container structure to include neighboring cell measurement results.

20. A radio access network as in claim 14, wherein the radio access network node fills the container structure to include handoff command information.

21. A radio access network as in claim 14, wherein the second network is a core network.

22. A radio access network as in claim 14, wherein the content of the container structure comprises communication parameters for the foreign communication system.

23. A radio access network as in claim 22, wherein the communication parameters for the foreign communication system are written by the foreign communication system.

24. A radio access network as in claim 14, wherein the content of the container structure includes a message or command dictated by the foreign communications protocol.

25. A radio access network as in claim 24, wherein the command is a handover command.

26. A radio access network as in claim 14, wherein the radio access network is a Universal Mobile Telephone System (UMTS) radio access network and the foreign communication system is one of a Group Special Mobile (GSM) or Personal Digital Cellular (PDC) communication system.

27. A radio access network as in claim 14, wherein the radio access network is a third generation system and the foreign communication system is second generation system.

28. A method of operating a mobile radio network, the mobile radio network comprising:
- a radio access network having a radio access network node structure for communicating using an associated first communication protocol with a multi-mode mobile radio in a first cell serviced by said radio access network; and
- a second network having an associated foreign communication protocol for communicating to the multi-mode mobile radio in at least one foreign cell neighboring said first cell and serviced by said second network according to said foreign communication protocol, said radio network and said second network being in handoff communication with each other to handoff said mobile radio when said mobile radio commutes from the first cell to one of said foreign cells;

the method comprising:
- providing a data mechanism for facilitating said handoff communication, said data mechanism comprising a container structure;
- including in the container structure content expressed in the foreign communications protocol;
- using the node structure as a conduit for communicating the contents of the container to the multi-mode mobile radio and wherein the node structure need not understand the content of the container structure;
- providing the container structure with a dedicated data mapped structure generic to said radio access network and said foreign communication system such that said generic data mapped structure transports both handover data content unique to said first communication protocol and handover data content unique to said foreign communication protocol.

29. A method as in claim 28, further comprising the radio access network node filling the container structure to include broadcast system information.

30. A method as in claim 28, further comprising the multi-mode radio filling the container structure to include mobile radio capabilities information.

31. A method as in claim 28, further comprising the radio access network node filling the container structure to include neighboring cell information.

32. A method as in claim 28, further comprising the radio access network node filling the container structure to include neighboring cell measurement instructions.

33. A method as in claim 28, further comprising the mobile radio filling the container structure to include neighboring cell measurement results.

34. A method as in claim 28, further comprising the radio access network node filling the container structure to include handoff command information.

35. A method as in claim 28, wherein the second network is a core network.

36. A method as in claim 28, further comprising including communication parameters for the foreign communication system in the content of the container structure.

37. A method as in claim 36, further comprising the foreign communication system writing the communication parameters for the foreign communication system.

38. A method as in claim 28, further comprising including a message or command dictated by the foreign communications protocol in the content of the container structure.

39. A method as in claim 38, further comprising including a handover command in the content of the container structure.

40. A method as in claim 28, wherein the radio access network is a Universal Mobile Telephone System (UMTS) radio access network and the foreign communication system is one of a Group Special Mobile (GSM) or Personal Digital Cellular (PDC) communication system.

41. A method as in claim 28, wherein the radio access network is a third generation system and the foreign communication system is second generation system.

42. A method of operating a mobile radio network, the mobile radio network comprising:
- a radio access network having a radio access network node structure for communicating using an associated first communication protocol with a multi-mode mobile radio in a first cell serviced by said radio access network; and
- a second network having an associated foreign communication protocol for communicating to the multi-mode mobile radio in at least one foreign cell neighboring said first cell and serviced by said second network according to said foreign communication protocol, said radio network and said second network being in handoff communication with each other to handoff said mobile radio when said mobile radio commutes from the first cell to one of said foreign cells;

the method comprising:
- providing a data mechanism for facilitating said handoff communication, said data mechanism comprising a container structure;
- including in the container structure content expressed in the foreign communications protocol;
- using the node structure as a conduit for communicating the contents of the container to the multi-mode mobile radio and wherein the node structure need not understand the content of the container structure;
- exchanging handoff-specific information between second network associated with, respectively, said first radio communication protocol and said foreign communication protocol, and
- filling said handoff-specific information container between said second network with said handoff information in a form particular to said foreign radio communication protocol type.

* * * * *

UNITED STATES PATENT AND TRADEMARK OFFICE
CERTIFICATE OF CORRECTION

PATENT NO. : 7,778,641 B2  
APPLICATION NO. : 09/286471  
DATED : August 17, 2010  
INVENTOR(S) : Willars et al.

Page 1 of 2

It is certified that error appears in the above-identified patent and that said Letters Patent is hereby corrected as shown below:

In Fig. 16, Sheet 10 of 10, in Line 11, delete "Type 2)" and insert -- Type 2,...) --, therefor.

In Fig. 16, Sheet 10 of 10, below "FIGURE 16", in Line 1, delete "7b-OptimisedI" and insert -- 7b-Optimised --, therefor.

In Fig. 10, Sheet 10 of 10, delete " [Cell Identifier (as specified by the foreign system)] " and insert -- [Cell Identifier (as specified by the foreign system)] --, therefor.

In Column 3, Lines 18-19, after "embodiment" delete "of the present invention".

In Column 4, Line 39, delete "1a." and insert -- 1A. --, therefor.

In Column 10, Line 37, in Claim 2, delete "mobile radio network is" and insert -- radio access network as --, therefor.

In Column 10, Line 40, in Claim 3, delete "mobile radio network is" and insert -- radio access network as --, therefor.

In Column 10, Line 43, in Claim 4, delete "mobile radio network is" and insert -- radio access network as --, therefor.

In Column 10, Line 46, in Claim 5, delete "mobile radio network is" and insert -- radio access network as --, therefor.

Signed and Sealed this  
First Day of March, 2011

David J. Kappos  
*Director of the United States Patent and Trademark Office*

CERTIFICATE OF CORRECTION (continued)
U.S. Pat. No. 7,778,641 B2

In Column 10, Line 49, in Claim 6, delete "mobile radio network is" and insert -- radio access network as --, therefor.

In Column 10, Line 52, in Claim 7, delete "mobile radio network is" and insert -- radio access network as --, therefor.